United States Patent [19]
Bell et al.

[11] 3,714,188

[45] Jan. 30, 1973

[54] PROCESS FOR THE PREPARATION OF 3-ARYL-2-IMINO-3-INDOLINOLS AND 2-AMINO-3-ARYL-3H-INDOL-3-OLS AND RELATED COMPOUNDS

[75] Inventors: Stanley C. Bell, Penn Valley; Carl Gochman, Philadelphia, both of Pa.

[73] Assignee: American Home Products Corporation, New York, N.Y.

[22] Filed: Dec. 9, 1970

[21] Appl. No.: 96,654

Related U.S. Application Data

[60] Division of Ser. No. 752,488, Aug. 14, 1968, Pat. No. 3,577,435, which is a continuation-in-part of Ser. No. 694,066, Dec. 28, 1967, Pat. No. 3,576,001.

[52] U.S. Cl. ............................................. 260/326.15
[51] Int. Cl. ............................................. C07d 27/56
[58] Field of Search ................................. 260/326.15

[56] References Cited

UNITED STATES PATENTS 3,441,570    4/1969    Meyer..................................260/325

*Primary Examiner*—Alex Mazel
*Assistant Examiner*—Joseph A. Narcavage
*Attorney*—Andrew Kafko, Joseph Martin Weigman, Dwight J. Potter, Vito Vicoor Bellino and Robert Wiser

[57] ABSTRACT

A new process is disclosed reacting a 2-benzoyl acylanilide with ionic cyanides to form new 3-aryl-2-imino-3-indolinols and 2-amino-3-aryl-3H-indol-3-ols. These products may be further reacted to form a number of new derivatives which have pharmacological activity as central nervous system depressants.

6 Claims, No Drawings

PROCESS FOR THE PREPARATION OF 3-ARYL-2-IMINO-3-INDOLINOLS AND 2-AMINO-3-ARYL-3H-INDOL-3-OLS AND RELATED COMPOUNDS

This application is a division of application Ser. No. 752,488 filed Aug. 14, 1968, now U.S. Pat. No. 3,577,435 which is in turn a continuation-in-part of application Ser. No. 694,066, filed Dec. 28, 1967 and entitled "A Process for the Preparation of 3-Aryl-2-Imino-3-Indolinols and 2-Amino-3-Aryl-3H-Indol-3-ols", now U.S. Pat. No. 3,576,001.

This invention relates to new 3-aryl-2-imino-3-indolinols and 2-amino-3-aryl-3H-indol-3-ols and their derivatives, and to a new process for their preparation by reacting a 2-benzoyl acylanilide with an ionic cyanide.

The new and novel compounds within the purview of the present invention are exemplified by those having the following formula:

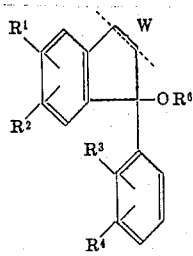

(I)

Where W is

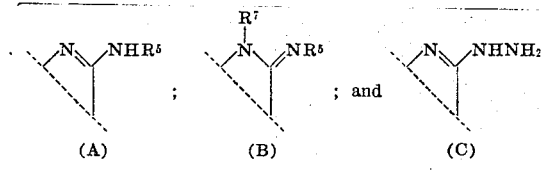

(A) (B) ; and (C)

and $R^1$ and $R^3$ are the same or different members selected from the group consisting of hydrogen, halogen, lower alkyl and lower alkoxy;

$R^2$ and $R^4$ are the same or different members selected from the group consisting of hydrogen and sulfamoyl;

$R^5$ is selected from the group consisting of hydrogen, lower alkyl, lower alkylamino(lower)alkyl; di(lower)alkylamino (lower)alkyl;

$R^6$ is selected from the group consisting of hydrogen and lower alkyl, with the proviso that $R^6$ is hydrogen when W is structure (C);

$R^7$ is selected from the group consisting of hydrogen, lower alkyl, lower alkanoyl, halo(lower)alkanoyl and dihalo (lower)alkanoyl;

With the proviso that when $R^7$ is other than hydrogen and lower alkyl, $R^5$ and $R^6$ are hydrogen;

With the proviso that when $R^5$, $R^6$ and $R^7$ are lower alkyl, they are the same; and With the further proviso that $R^6$ and $R^7$ are hydrogen when $R^5$ is either loweralkylamino(lower)alkyl, or di(lower)alkyl-amino(lower)alkyl.

As used herein the terms "lower alkyl", "lower alkoxy", and the like describe groups containing from one to eight carbon atoms.

Typical examples of the compounds of this invention which are depicted by structural formula (IB) are:
5-chloro-1-(2,2-dichloroacetyl)-2-imino-3-(m-sulfamoylphenyl)-3-indolinol;
5-chloro-3-(2-chloro-5-sulfamoylphenyl)-1-(2,2-dichloroacetyl)-2-imino-3-indolinol.

Alternatively, the compounds of this invention which are represented by structural formula (IA) are typified by:
2-amino-5-chloro-3-phenyl-3H-indol-3-ol; and
2-amino-5-chloro-3-(m-sulfamoylphenyl)-3H-indol-3-ol.

Still further typical examples of the compounds of this invention illustrated by structural formula (IC) are:
4-chloro-3-(CZ5-chloro-2-hydrazino-3-hydroxy-3H-indol-3-yl)-benzenesulfonamide; 3-(2-hydrazino-3-hydroxy-3H-indol-3-yl)-benzenesulfonamide; 3-(4-chlorophenyl)-2-hydrazino-5-methoxy-3H-indol-3-ol; and 2-hydrazino-6-methyl-3-(4-tolyl)-3H-indol-3-ol.

The compounds of this invention designated by structural formulas (IA) and (IB) are tautomers where $R^5$ and $R^7$ are hydrogen.

The compounds of this invention designated by structural formula (IA) are called 2-alkylaminoalkylamino-3-aryl-3H-indol-3-ols when $R^6$ is hydrogen and $R^5$ is loweralkylamino (lower)alkyl or di(lower)alkylamino(lower)alkyl, for example, 5-chloro-2-[2-(dimethylamino)ethylamino]3-phenyl-3H-indol-3-ol.

The compounds of this invention designated by structural formula (IA) are called 3-alkoxy-2-alkylamino-3-arylindoles where $R^5$ and $R^6$ are lower alkyl, for example, 5-chloro-3-methoxy-2-methylamino-3-phenylindole. The compounds of this invention designated by structural formula (IA) are called 2-alkylamino-3-arylindol-3-ols, when $R^5$ is lower alkyl and $R^6$ is hydrogen, for example 5-chloro-2-methylamino-3-phenyl-3-indol-3-ol.

The compounds of this invention designated by structural formula (IB) are called 2-alkylaminoalkylimino-3-aryl-indolinols where $R^5$ is lower alkylamino(lower)alkyl or di(lower)alkylamino(lower)alkyl and $R^6$ and $R^7$ are hydrogen, for example 5-chloro-2-[2-(dimethylamino)ethylimino]-3-phenyl-3H-indolinol. The compounds of this invention designated by structural formula (IB) are called 2-alkylamino-3-arylindolinols where $R^5$ is lower alkyl and $R^6$ and $R^7$ are hydrogen, for example, 5-chloro-2-methylimino-3-phenyl-3-indolinol. The compounds of this invention designated by structural formula (IB) are called 3-alkoxy-2-alkylimino-3-arylindolines where $R^5$ and $R^6$ are lower alkyl and $R^7$ is hydrogen, for example, 5-chloro-3-methoxy-2-methylimino-3-phenylindoline.

The compounds of this invention designated by structural formula (IB) are called 3-alkoxy-1-alkyl-2-alkylimino-3-arylindolines, where $R^5$, $R^6$ and $R^7$ are lower alkyl, for example 5-chloro-3-methoxy-1-methyl-2-methylimino-3-phenylindoline.

The compounds of this invention designated by structural formula (IC) are called 3-aryl-2-hydrazino-3H-indol-3-ols, for example, 2-hydrazino-6-methyl-3-(4-tolyl)-3H-indol-3-ol.

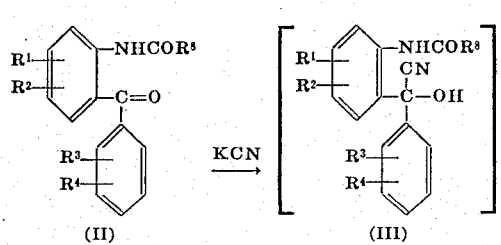
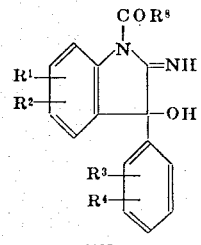
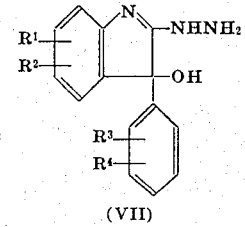
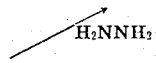
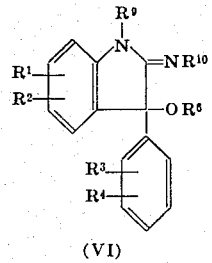
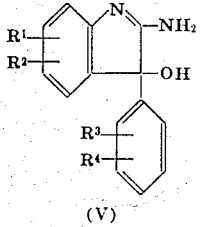
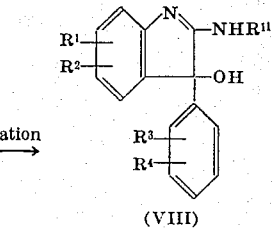

Where $R^1-R^7$ are defined as above;

$R^8$ is selected from the group consisting of lower alkyl, halo(lower)alkyl, and dihalo(lower) alkyl;

$R^9$ is selected from the group consisting of hydrogen and lower alkyl;

$R^{10}$ is lower alkyl; and $R^{11}$ is selected from the group consisting of lower alkylamino(lower)alkyl, and di(lower)alkylamino(lower)alkyl.

The 2-benzoylacylanilides which are used as starting materials to prepare the compounds of the present invention may be prepared as described in U.S. Pat. application Ser. No. 704,585 filed Feb. 12, 1968 by Stanley C. Bell and titled "5,5'-Disulfamoylbenzophenones" and now U.S. Pat. No. 3,526,646.

In preparing the compounds of the present invention a 2-benzoyl acylanilide (II) is mixed with an ionic cyanide in the presence of a proton donor, such as water. The mechanism of the process is believed to include the formation of an intermediate (III) which is not separated or recovered. After a predetermined period as hereinafter set forth the reaction mixture is concentrated to dryness, and the residue dissolved in water. The solution is acidified, for example, with acetic acid, and a solid containing a mixture of compounds (IV) and (V) precipitates. The mixture is suspended in an acid, such as dilute hydrochloric acid, and filtered. The collected solid is an appropriate 3-aryl-2-imino-3-indolinol (IV). The filtrate is then neutralized with a base, for instance with sodium carbonate, and the resulting precipitate is a 2-amino-3-aryl-3H-indol-3-ol (V) which may be further purified by recrystallization from an alcohol-water solvent.

The ionic cyanide employed as a reactant in the above reaction may be sodium cyanide, lithium cyanide, calcium cyanide, cuprous cyanide or, preferably, potassium cyanide. The reaction is preferably carried out in an organic solvent that is miscible with the proton donor and does not react with the ionic cyanide. Such solvents include alkanols, dioxane, dimethoxyethane and the like, ethanol being preferred. The reaction is carried out at a temperature between about 0° to 50°C. for between one-quarter of an hour and 72 hours. When the reaction is conducted at relatively lower temperatures and shorter time periods, the resulting mixture of products contains a preponderance of a 3-aryl-2-imino-3-indolinol (IV). Alternatively, when the reaction is conducted at relatively higher temperatures and longer time periods, the resulting mixture of the products contains a preponderance of a 2-amino-3-aryl-3H-indol-3-ols (V). The latter reaction and the method of separating the 2-amino-3-aryl-3H-indol-3-ols is exemplified in Example 1.

The 3-aryl-3-imino-3H-indol-3-ols (IV) which are separated from the above reaction may be hydrolyzed by conventional procedures to form the corresponding 2-amino-3-aryl-3H-indol-3-ols (V), for instance by mixing with an ionic cyanide, or a strong base, such as sodium hydroxide, for about 15 minutes to about 10 hours at about room temperature to about 50°C.

The 2-amino-3-aryl-3H-indol-3-ols (V) are useful as intermediates in the preparation of compounds of U.S. Pat. application Ser. No. 694,089 filed Dec. 28, 1967 by Stanley C. Bell et al and entitled "2-Acylamido-3-Aryl-3H-Indol-3-ol Esters and Related Compounds" which was abandoned and refiled as application Ser. No. 7,304 on Jan. 13, 1970. The latter compounds have central nervous system activity as depressants. That is, they produce a calming effect in the host.

To prepare a 2-alkylaminoalkylamino-3-aryl-3H-indol-3-ol (VIII) a 2-amino-3-aryl-3H-indol-3-ol (V) is heated at a temperature range of about 100°C. to about reflux temperatures for a period of about one-half to about six hours, with a di(lower)alkylamino(lower)alkyl halide or a lower alkylamino (lower)alkylhalide, such as dialkylaminoalkylchloride, for instance, dimethylaminoethylchloride, and a non-reactive base such as tri-substituted amines, particularly a trialkylamine, for instance triethylamine. In this reaction an appropriate hydrohalide may be substituted for the di(lower)alkylamino(lower) alkylhalide or lower alkylamino(lower)alkylhalide. When the reaction is complete, the reaction mixture is diluted with a large volume of water. Thereafter, the supernatant liquid is removed by decantation and the insoluble 2-alkylaminoalkylamino-3-aryl-3H-indol-3-ol (VIII) is recovered by well-known techniques. For instance, the insoluble product may be suspended in an acidic medium such as dilute acetic acid and then filtered. Thereafter, the filtrate may be neutralized, for instance, with sodium carbonate or potassium carbonate and then recrystallized from a lower alcohol such as ethanol. If desired, the free base, 2-alkylaminoalkylamino-3-aryl-3H-indol-3-ol (VIII), may be converted to its corresponding mineral acid salt e.g., the hydrochloride salt by contact with an appropriate mineral acid in ether and then recrystallized from ethanol.

The products of this invention having structural formula VI where $R^6$, $R^9$, or $R^{10}$ are alkyl may be prepared by the following procedure. A 2-amino-3-aryl-3H-indol-3-ol (V) is suspended in a protionic solvent, such as an alkanol, preferably ethanol. To the suspension is added a predetermined amount of a basic catalyst, such as potassium hydroxide, sodium hydroxide, sodium bicarbonate, potassium carbonate and the like. Then an alkylating agent, such as sulfate esters, for instance dimethylsulfate and diethylsulfate, arylsulfonate esters, for instance, methyl-p-toluenesulfonate, alkyl halides, for instance, methyl bromide, etc., is added until the reaction mixture is no longer basic. The reaction mixture is then made basic, for instance with sodium hydroxide, and diluted with water to yield the product. The product may be recovered by well known procedures. For instance, the product may be filtered and recrystallized, for instance from an ethanol-water mixture, to obtain the pure product.

The relative amounts of basic catalyst, alkylating agent, and 3-aryl-3H-indol-3-ol (V) determine whether the product will have one, two or three alkyl substituents. The preponderance of the product contains 3-alkyl groups when three equivalents of basic catalyst and alkylating agent are used with relation to the 2-amino-3-aryl-3H-indol-3-ol, the product being a 3-alkoxy-1-alkyl-2-alkylimino-3-arylindoline.

When about 1.5 equivalents of basic catalyst and alkylating agent, based on the 2-amino-3-aryl-3H-indol-3-ol (V) are used, the product consists predominantly of a mixture of monoalkyl and dialkyl substituted products. The monoalkyl and dialkyl substituted products may be separated from each other by well known means. For instance, the product may be suspended in an organic medium such as acetonitrile. Recrystallization from the organic medium affords the monoalkyl substituted product a 2-alkylimino-3-arylindolinol.

The solution from which the latter product is obtained may be concentrated to dryness to afford the crude dialkyl-substituted product, a 3-alkoxy-2-alkylimino-3-arylindoline. Recrystallization from an alcohol-water mixture and then from hexane affords the purified dialkyl substituted product.

The 3-aryl-2-hydrazino13H-indol-3-ol compounds, (VII) of this invention are prepared by contacting an appropriate 3-aryl-2-imino-3-indolinol (IV), or 3-aryl-3H-indol-3-ol (V) with hydrazine in a reaction-inert solvent at a temperature range from about 60°C. to about 100°C. for a period of 30 minutes to 4 hours using a 3-aryl-2-imino-3-indolinol (IV) or for a period of about 15 minutes to about 60 minutes using a 3H-indol-3-ol (V). Preferably this reaction is conducted using a 2-amino-3-aryl-3-H-indol-3-ol in water at about steam bath temperatures for a period of about one-half hour.

When the reaction is complete, the resulting 3-aryl-2-hydrazino-3H-indol-3-ol (VII) is separated by standard recovery procedures. For example, the reaction mixture is cooled, diluted, acidified with an organic acid, e.g. acetic acid, filtered and the collected solid is recrystallized from a suitable solvent, e.g., an alkanol-water mixture.

By a "reaction-inert solvent" as employed herein is meant a liquid which will dissolve the reactants and not interfere with their interaction. Many such solvents will readily suggest themselves to one skilled in the art of chemistry, e.g. waters and alkanols.

The 2-alkylaminoalkylamino-3-aryl-3H-indol-3-ols and 2-alkylaminoalkylimino-3-arylindolinols of this invention have utility as central nervous system depressants. That is, they produce a calming effect in the host.

In the pharmacological evaluation of the biological activity of the compounds of this invention, the in vivo effects are tested as follows. The compound is administered orally or intraperitoneally to three mice (14 to 24 grams) at each of the following doses: 400, 127, 40 and 12.7 mg./kg. of mouse body weight (MPK). The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The compounds of formulas VI, VII and VIII of this invention are depressants in the dose range from 127 MPK administered orally to 400 MPK administered intraperitoneally. The compounds of formula IV and V are intermediates in the preparation of compounds that have such activity. Some of the compounds of formula V also have depressant activity.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, and then dehydrated sufficiently to make it suitable for pressing into a solid form. They may be administered orally in the form of solutions which may contain coloring and flavoring agents or they may be injected parenterally, that is intra-muscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

Example 1

This example illustrates the preparation of 2-amino-5-chloro-3-phenyl-3H-indol-3-ol, a compound of formula V, from a compound of formula II.

To a suspension of 10.0 grams (g.) of 2'-benzoyl-2,2,4'-trichloroacetanilide in 150 milliliters (ml.) of ethanol is added a solution of 6.0 g. of potassium cyanide in 50 ml. of water. After stirring about 16 hours the reaction mixture is filtered from insoluble material and diluted with water to precipitate 7.0 g. of product. Recrystallization from aceto-nitrile gives the pure compound, 2-amino-5-chloro-3-phenyl-3H-indol-3-ol, having a melting point (m.p.) of 215°–217°C.

Based on the formula $C_{14}H_{11}ClN_2O$ it was calculated that the elemental analysis by weight would be 64.99 percent carbon, 4.29 percent hydrogen, 10.83 percent nitrogen, and 13.20 percent chlorine. The product was analyzed and the content was found to be 65.02 percent carbon, 3.98 percent hydrogen, 10.70 percent nitrogen and 13.70 percent chlorine. The foregoing may be expressed:

Analysis calculated for $C_{14}H_{11}ClN_2O$: C, 64.99; H, 4.29; N, 10.83; Cl, 13.20%.
Found: C, 65.02; H, 3.98; N, 10.70; Cl, 13.70%.

Example 2

To a mixture of 13.6 g. of 2'-benzoyl-4,4'-dichlorobutyranilide, 1.0 g. of sodium iodide and 125 ml. of ethanol is added 4.0 g. of potassium cyanide in 25 ml. of water, and the reaction mixture is stirred for 48 hours. Then 75 ml. of water are added and the by-product removed by filtration. The by-product is 1-(2-benzoyl-4-chlorophenyl)-2-pyrrolidinone. The filtrate is diluted with water, and there is filtered off the same compound as prepared in Example 1: 2-amino-5-chloro-3-phenyl-3H-indol-3-ol.

Example 3

To a mixture of 13.6 g. of 2'-benzoyl-4'-chlorohexano-ylanilide and 125 ml. of dimethoxyethane is added a solution of 4.0 g. of potassium cyanide in 25 ml. of water. After stirring for 48 hours, the reaction mixture is diluted with 75 ml. of water and filtered from impurities. The filtrate is diluted with a large volume of water to precipitate out the product which is the same as prepared by Example 1: 2-amino-5-chloro-3-phenyl-3H-indol-3-ol.

Examples 4–5

Proceeding as in Example 3, the following starting materials yield the following products:

| Example | Starting Material | Product |
|---|---|---|
| 4 | 2'-(2-fluoro-5-methylbenzoyl)-2,2,4'-trichloro-acetanilide | 2-amino-5-chloro-3-(2-fluoro-5-methylphenyl)-3H-indol-3-ol |
| 5 | 2'-(2-ethoxybenzoyl)2,2,4'-trichloro-acetanilide | 2-amino-5-chloro-3-(2-ethoxyphenyl)-3H-indol-3-ol |

Example 6

Following the procedure of Example 5 but utilizing 2,2,5'-trichloro-2'-(2-chloro-5-sulfamoylbenzoyl)-4'-sulfamoylacetanilide as the 2-benzoylanilide affords 2-amino-6-chloro-3-(2-chloro-5-sulfamoylphenyl)-3-hydroxy-3H-indole-5-sulfonamide.

Analysis for the product $C_{14}H_{12}Cl_2N_4O_5S_2 \cdot 1\frac{1}{2} H_2O$, calculated: C, 35.17; H, 3.16; N, 11.71; Cl, 14.82; S, 13.41; $H_2O$, 5.64%; Found: C, 34.82; H, 2.75; N, 11.66; Cl, 15.08; S, 13.67; $H_2O$, 5.55%.

Example 7

The following example illustrates the preparation, from a compound having formula II, of compounds having formulas IV and V, the latter being respectively, 5-chloro-1-(C2,2-dichloroacetyl)-2-imino-3-(m-sulfamoylphenyl)-3-indolinol and 2-amino-5-chloro-3-(m-sulfamoylphenyl)-3H-indol-3-ol.

To a suspension of 34 g. of 2,2,4'-trichloro-2'-(m-sulfamolybenzoyl)acetanilide in 400 ml. of ethanol is added a solution of 20 g. of potassium cyanide in 100 ml. of water. After stirring at room temperature for 1 ½ hours, the reaction mixture is concentrated to dryness and the residue dissolved in water. Acidification with acetic acid produces a solid which is suspended in dilute hydrochloric acid and filtered from 15.4 g. of insoluble material. Neutralization of the filtrate with sodium carbonate gives 5.7 g. of product, 2-amino-5-chloro-3-(m-sulfamoylphenyl)-3H-indol-3-ol, which is recrystallized from an alcohol-water solution and has a melting point of 216°–218°C. In infrared illumination the product has peaks at 6.07μ, 6.35μ, 7.72μ and 8.57μ.

Analysis for $C_{14}H_{12}ClN_3Cl_3S$, calculated: C, 49.78; H, 3.58; N, 12.44; Cl, 10.49; S, 9.49%.
Found: C, 49.81; H, 3.45; N, 12.61; Cl, 10.6; S, 9.6%.

The 15.4 g. of above insoluble material is recrystallized from a dimethylformamide-water solution, to yield 5-chloro-1-(2,2-dichloroacetyl)-2-imino-3-(m-sulfamoylphenyl)-3-indolinol, having a melting point of 269°–270°C. In infrared illumination, the product has peaks at 5.84μ, 6.14μ, 6.26μ, 7.86μ and 8.80μ.

Analysis calculated for $C_{16}H_{12}Cl_3N_3O_4S$: C, 42.82; H, 2.70; N, 9.36; Cl, 23.71; S, 7.15%.
Found: C, 42.92; H, 2.58; N, 9.24; Cl, 23.1; S, 7.1%.

Examples 8–23

Following the above procedure, of Example 7 and substituting the appropriate starting compounds the following products may be prepared:

| Example | Product |
|---------|---------|
| 8 | 5-bromo-1-(4,4-dibromobutyryl)-2-imino-3-(2-bromo-4-sulfamoylphenyl)-3-indolinol; |
| 9 | 2-amino-5-bromo-3-(2-bromo-4-sulfamoylphenyl)-3H-indol-3-ol; |
| 10 | 2-imino-1-(3-iodopropionyl)-5-iodo-3-phenyl-3-indolinol; |
| 11 | 2-amino-5-iodo-3-phenyl-3H-indol-3-ol; |
| 12 | 1-acetyl-3-(m-chlorophenyl)-2-imino-7-sulfamoyl-3-indolinol; |
| 13 | 2-amino-3-(m-chlorophenyl)-7-sulfamoyl-3H-indol-3-ol; |
| 14 | 2-imino-4-methoxy-3-(m-methoxyphenyl)-1-propionyl-3-indolinol; |
| 15 | 2-amino-4-methoxy-3-(m-methoxyphenyl)-3H-indol-3-ol; |
| 16 | 5-butanoxy-3-(m-butanoxyphenyl)-1-butyryl-2-imino-3-indolinol; |
| 17 | 2-amino-5-butanoxy-3-(m-butanoxyphenyl)-3H-indol-3-ol; |
| 18 | 1-acetyl-6-ethoxy-3-(2-ethoxy-4-iodophenyl)-2-imino-3-indolinol; |
| 19 | 2-amino-6-ethoxy-3-(2-ethoxy-4-iodophenyl)-3H-indol-3-ol; |
| 20 | 2-imino-5-methyl-3-(m-tolyl)-1-pentanoyl-3-indolinol; |
| 21 | 2-amino-5-methyl-3-(m-tolyl)-1-pentanoyl-3H-indol-3-ol; |
| 22 | 5-butyl-3-(m-butylphenyl)-1-(2-chloroacetyl)-2-imino-3-indolinol; |
| 23 | 2-amino-5-butyl-3-(m-butylphenyl)-3H-indol-3-ol; |

Example 24

In a procedure similar to Example 7, 5-chloro-3-(2-chloro-5-sulfamoylphenyl)-1-(2,2-dichloroacetyl)-2-imino-3-indolinol is prepared from 2,2,4'-trichloro-2'-(2-chloro-5-sulfamolybenzoyl)acetanilide and potassium cyanide. The product has a melting point of 203°–205°C. and is obtained as the hemi-alcoholate.

Analysis for $C_{16}H_{11}Cl_4N_3O_4S \cdot 1/2\ C_2H_6O$, calculated: C, 40.33; H, 2.79; N, 8.30; Cl, 28.02; S 6.34%.

Found: C, 39.61; H, 3.03; N, 8.11; Cl, 27.6; S, 6.7%.

Also isolated from the reaction as the hemi-hydrate is 2-amino-5-chloro-3-(2-chloro-5-sulfamoylphenyl)-3H-indol-3-ol.

Analysis calculated for $C_{14}H_{11}Cl_2N_3OS \cdot 1/2\ H_2O$: C, 44.10; H, 3.17; N, 11.02; Cl, 18.60; S, 8.41%.

Found: C, 44.29; H, 3.04; N, 10.95; Cl, 18.6; S, 8.2%.

Examples 25–28

In like manner, following the procedure of Example 24 the following starting materials are converted to the following products respectively:

| Example | Starting Material | Product |
|---------|------------------|---------|
| 25 | 4,4,4'-trifluoro-2'-(m-sulfamoylbenzoyl)butyranilide | 5-fluoro-1-(4,4-difluorobutyryl)-2-imino-3-(m-sulfamoylphenyl)-3-indolinol |
| 26 | 4,4,4'-trifluoro-2'-(m-sulfamolybenzoyl)butyranilide | 2-amino-5-fluoro-3-(m-sulfamoylphenyl)-3H-indol-3-ol |
| 27 | 2,2,dichloro-2'-(2-chloro-5-sulfamoylbenzoyl)-4'-fluoroacetanilide | 3-(2-chloro-5-sulfamoylphenyl)-1-(2,2-dichloroacetyl)-5-fluoro-2-imino-3-indolinol |
| 28 | 2,2,dichloro-2'-(2-chloro-5-sulfamoylbenzoyl)-4'-fluoroacetanilide | 2-amino-3-(2-chloro-5-sulfamoylphenyl)-5-fluoro-3H-indol-3-ol |

Example 29

The following example illustrates the preparation from a compound (IV) of a compound (V), the latter being 2-amino-5-chloro-3-(2-chloro-5-sulfamoylphenyl)-3H-indol-3-ol.

A suspension of 1.9 g. of 5-chloro-3-(2-chloro-5-sulfamoylphenyl)-1-(2,2-dichloroacetyl)-2-imino-3-indolinol in 50 ml. of water is heated with 5 ml. of 4N dilute sodium hydroxide. The mixture is heated on a steam bath for 1 hour and cooled. The cool reaction mixture is acidified by the addition of acetic acid, and a precipitate forms. The precipitate is filtered out and twice recrystallized from an alcohol-water mixture. The product, 2-amino-5-chloro-3-(2-chloro-5-sulfamolyphenyl)-3H-indol-3-ol, has a melting point of 215°–216°C.

Example 30

The following illustrates the preparation of a compound of formula VIII.

A. A mixture of 2.8 grams of 2-amino-5-chloro-3-phenyl-3H-indol-3-ol, 3.4 grams of dimethylaminoethyl chloride hydrochloride, 7 milliliters of triethylamine and 20 milliliters of dimethylformamide is refluxed with stirring for 1 hour. When the reaction is complete, the reaction mixture is diluted with a large volume of water and decanted. The insoluble material is suspended in dilute acetic acid, filtered and the filtrate neutralized with sodium carbonate. The product is 5-chloro-2-[2-(dimethylamino)ethylamino]-3-phenyl-3H-indol-3-ol.

B. The resultant free base is converted to hydrochloride salt in ether and recrystallized from acetonitrile yielding 1.5 grams of 5-chloro-2-[2-(dimethylamine)ethylamino]3-phenyl-3H-indol-3-ol, hydrochloride having a melting point of 247°–249°C. Recrystallization from ethanol results in a product which decomposes at 257°–258°C.

Based on the formula $C_{18}H_{20}ClN_3O \cdot 2HCl \cdot 1/2\ H_2O$, it is calculated that the elemental analysis by weight will be 52.50 percent carbon, 5.63 percent hydrogen, 10.21 percent nitrogen, 25.94 percent chlorine and 2.18 percent water. The product is analyzed and the content is found to be 52.68 percent carbon, 5.92 percent hydrogen, 10.02 percent nitrogen, 25.5 percent chlorine and 2.09 percent water. The foregoing may be expressed:

Analysis calculated for $C_{18}H_{20}ClN_3O \cdot 2HCl \cdot 1/2\ H_2O$: C, 52.50; H, 5.63; N, 10.21; Cl, 25.94; $H_2O$, 2.18;

Found: C, 52.68; H, 5.92; N, 10.02; Cl, 25.5; $H_2O$, 2.09.

Examples 31–45

Proceeding as described in Example 30A but reacting an appropriate 2-amino-3-aryl-3H-indol-3-ol with an appropriate lower alkyl, mono- or di-(lower)alkylamino lower alkyl, affords the following products:

| Example | Product |
|---------|---------|
| 31 | 2-[2-(diethylamino)ethylamino]-4-fluoro-3-(3-fluoro-5-sulfamoylphenyl)-6-sulfamoyl-3H-indol-3-ol; |
| 32 | 5-bromo-3-(m-bromophenyl)-2-[3-dimethylamino)propyl-amino]-3H-indol-3-ol; |
| 33 | 2-[4-(dibutylamino)butylamino]-5-chloro-3-(m-chloro-phenyl)-3H-indol-3-ol; |
| 34 | 5-iodo-3-(m-iodophenyl)-2-dimethylaminomethylamino-3H-indol-3-ol; |

| | |
|---|---|
| 35 | 7-chloro-3-(3-chloro-5-sulfamoylphenyl)-2-methylamino-methylamino-4-sulfamoyl-3H-indol-3-ol; |
| 36 | -bromo-3-(m-bromophenyl)-2-[2-(ethylamino)ethylamino]-3H-indol-3-ol; |
| 37 | 2-[4-(butylamino)butylamino]-7-fluoro-3-(m-fluorophenyl)-3H-indol-3-ol; |
| 38 | 5-iodo-3-(m-iodophenyl)-2-methylaminoethylamino-3H-indol-3-ol; |
| 39 | 5-chloro-3-(m-chlorophenyl)-2-[2-(ethylamino)ethylamino]-3H-indol-3-ol; |
| 40 | 3-(m-butylphenyl)-2-methylamino-5-propyl-3H-indol-3-ol; |
| 41 | 5-ethyl-2-ethylamino-3-(p-ethylphenyl)-3H-indol-3-ol; |
| 42 | 5-methyl-3-(m-methylphenyl)-2-pentylamino-3H-indol-3-ol; |
| 43 | 3-(m-ethoxyphenyl)-5-methoxy-2-methylamino-3H-indol-3-ol; |
| 44 | 5-ethoxy-3-(m-ethoxyphenyl)-2-ethylamino-3H-indol-3-ol; |
| 45 | 5-butoxy-3-(m-butoxyphenyl)-2-propylamino-3H-indol-3-ol; |

Example 46

This example described the preparation of 5-chloro-3-methoxy-1-methyl-2-methylimino-3-phenylindoline, a trialkyl substituted product having formula VI.

To a suspension of 2.5 g. of 2-amino-5-chloro-3-phenyl-3H-indol-3-ol in 50 ml. of ethanol and 3 equivalents of alkali was added dimethyl sulfate until the reaction was no longer basic. The reaction mixture was then made basic with sodium hydroxide and diluted with 100 ml. of water to produce a sticky solid (1.5 g.). Two recrystallizations from an ethanol-water mixture afforded the product, 5-chloro-3-methoxy-1-methyl-2-methylimino-3-phenylindoline, having an mp 109°–112°.

Analysis calculated for $C_{17}H_{17}ClN_2O$: C, 67.88; H, 5.70; Cl, 11.79; N, 9.32.

Found: C, 68.55; H, 5.62; Cl, 11.80; N, 9.37.

Examples 47–49

Proceeding as described in Example 46 but substituting an appropriate dialkylsulfate and an appropriate 2-amino-3-phenyl-3H-indol-3-ol, the following products are afforded:

| Example | Product |
|---|---|
| 47 | 3-butoxy-1,5-dibutyl-2-butylimino-3-(p-bromophenyl) indoline |
| 48 | 3,6-diethoxy-1-ethyl-2-ethylimino-3-(m-ethylphenyl-indole) |
| 49 | 5-fluoro-3-(m-methyl-p-sulfamoyl)phenyl-3-propoxy-1-propyl-2-propyliminoindole |

Example 50

This example describes the preparation of a monoalkyl substituted product, 5-chloro-2-methylimino-3-phenyl-3-indolinol, and a dialkylsubstituted product 5-chloro-3-methoxy-2-methylimino-3-phenylindoline, compounds of formula VI.

Part A.

To a suspension of 5.0 g. of 2-amino-5-chloro-3-phenyl-3H-indol-3-ol in 100 ml. of ethanol and 1.5 moles of alkali was added dimethyl sulfate until the reaction was neutral. The reaction mixture was made alkaline with sodium hydroxide, diluted with 200 ml. of water and the resultant semi-solid suspended in acetonitrile to afford 1.2 g. of solid, mp 175°–178°. Recrystallization from acetonitrile produced 0.9 g. of 5-chloro-2-methylimino-3-phenyl-3-indolinol having a mp 179°–181°.

Analysis calculated for $C_{15}H_{13}ClN_2O$: C, 66.06; H, 4.80; Cl, 13.00; N, 10.27.

Found: C, 65.80; H, 4.99; Cl, 13.15; N, 10.15.

Part B

The acetonitrile solution from Part A, was concentrated to dryness in vacuo to afford 1.1 g. 5-chloro-3-methoxy-2-methylimino-3-phenylindoline. Recrystallization from an alcohol-water mixture and then from hexane gave the pure compound having a mp. 120°–122°.

Analysis calculated for $C_{16}H_{15}ClN_2O$: C, 67.01; H, 5.27; Cl, 12.36; N, 9.77.

Found: C, 66.98; H, 5.31; Cl, 12.50; N, 9.09.

Examples 51–53

Proceeding as described in Parts A and B of Example 50 but substituting an appropriate dialkylsulfate and an appropriate 2-amino-5-chloro-3-phenyl-3H-indol-3-ol the following products are afforded.

| Example | Part A | Part B |
|---|---|---|
| 51 | 5-butyl-2-butylimino-3-(m-iodo)phenyl-3-indolinol | 3-butoxy-5-butyl-2-butylimino-3-(m-iodo)phenyl-indoline |
| 52 | 6-ethoxy-2-ethylimino-3-(p-ethyl-m-sulfamoyl)phenyl)-3-indolinol | 3,6-diethoxy-2-ethylimino-3-(p-ethyl-m-sulfamoyl)-phenylindoline |
| 53 | 5-methyl-3-(p-methoxy)phenyl-2-propylimino-3-indolinol | 5-methyl-3-(p-methoxy)-phenyl-2-propylimino-3-propoxyindoline |

Example 54

The following example illustrates the preparation of a compound having structural formula VII.

A solution of 2.0 g. of 5-chloro-3-(2-chloro-5-sulfamoylphenyl)-1-(2,2-dichloroacetyl)-2-imino-3-indolinol, 10 ml. of hydrazine hydrate and 10 ml. of water is heated on the steam bath for one-half hour. The reaction mixture is cooled, diluted with water and acidified with acetic acid. The product is filtered, suspended in acetonitrile and refiltered. After recrystallization from ethanol-water there is obtained 1.0 g. of 4-chloro-3-(5-chloro-2-hydrazino-3-hydroxy-3H-indol-3-yl) benzenesulfonamide having a melting point of 195°–196°C.

Analysis calculated for $C_{14}H_{12}Cl_2N_4O_3S$: C, 43.42; H, 3.12; N, 14.47; Cl, 18.31; S, 8.23;

Found: C, 43.28; H, 3.23; N, 13.88; Cl, 17.9; S, 8.5.

Examples 55 and 56

Similarly following the procedure of Example 54, 5-bromo-3-(2-hydrazino-3-hydroxy-3H-indol-3-yl)benzenesulfonamide; and 3-(6-bromo-2-hydrazino-3-hydroxy-3H-indol-3-yl)-6-methylbenzenesulfonamide are prepared.

Example 57

The following example illustrates the preparation of a compound of formula VII.

A mixture of 0.5 grams of 2-amino-5-chloro-3-phenyl-3H-indol-3-ol, 5 milliliters of hydrazine hydrate, 5 milliliters of water and 20 milliliters of ethanol are heated to reflux temperatures for one-half hour and upon cooling yield 0.4 grams of white solid 5-chloro-2-hydrazino-3-phenyl-3H-indole-3-ol, having a melting point of 203°–204°(from ethanol). The product is solvated with one-half mole of ethanol.

Analysis calculated for $C_{14}H_{12}ClN_3O \cdot 1/2\ C_2H_6O$: C, 60.71; H, 5.10; N, 14.16.

Found: C, 60.68; H, 4.82; N, 14.31.

Example 58

The following example illustrates the preparation of a compound having formula VII.

A mixture of 0.8 grams of 2-amino-5-chloro-3-(2-chloro-5-sulfamoylphenyl)-3H-indole-3-ol, 8 milliliters of hydrazine hydrate and 8 milliliters of water are heated to reflux for one quarter hour. The solution is cooled, diluted with an equal volume of water, filtered from impurities and acidified with acetic acid. The reaction mixture is chilled overnight and 0.7 grams of 6-chloro-3-(2-chloro-5-sulfamoylphenyl)-2-hydrazino-3-hydroxy-3H-indole-5-sulfonamide having a melting point of 212°–213° (decomposes) is obtained.

Analysis calculated for $C_{14}H_{13}Cl_2N_5O_5S_2$: C, 36.06; H, 2.81; N, 15.01; S, 13.75.

Found: C, 35.53; H, 2.85; N, 14.60; S, 13.30.

Example 59

The following example illustrates the preparation of a compound having formula VII.

A solution of 1.0 g. of 1-acetyl-2-imino-3-(5-sulfamoylphenyl)-3-indolinol, 5 ml. of hydrazine and 5 ml. of water is heated at 60°C. for four hours. The reaction mixture is cooled, diluted with water and acidified with citric acid. The product is filtered, suspended in acetonitrile and refiltered. After recrystallization from methanol-water there is afforded 3-(2-hydrazino-3-hydroxy-3H-indol-3-yl)benzenesulfonamide.

Example 60

The following example illustrates the preparation of a compound having formula VII.

A solution of 20.0 g. of 3-(4-chlorophenyl)-1-(2-chloroacetyl)-2-imino-5-methoxy-3-indolinol, 100 ml. of hydrazine hydrate and 100 ml. of water is heated on the steam bath for one hour. The reaction mixture is cooled, diluted with water and acidified with acetic acid. The product is filtered, suspended in acetonitrile and refiltered. After recrystallization from propanol-water there is obtained 3-(4-chlorophenyl)-2-hydrazino-5-methoxy-3H-indol-3-ol.

Example 61

In like manner to that of Example 60 1-(2,2-dichloroacetyl)-2-imino-6-methyl-3-(4-tolyl)-3-indolinol is converted to 2-hydrazino-6-methyl-3-(4-tolyl)-3H-indol-3-ol.

Examples 62–70

Repeating the procedure described in Example 54 to react an appropriate 3-aryl-1-(dihaloalkanoyl)-2-imino-3-indolinol with hydrazine, the following compounds are obtained:

| Example | Product |
|---|---|
| 62 | 6-ethyl-3-(4-fluorophenyl)-2-hydrazino-3H-indol-3-ol; |
| 63 | 2-hydrazino-3-phenyl-3H-indol-3-ol; |
| 64 | 2-hydrazino-3-(4-iodophenyl)-3H-indol-3-ol; |
| 65 | 5-ethoxy-2-hydrazino-3-(3-methoxyphenyl)-3H-indol-3-ol; |
| 66 | 3-(4-butoxyphenyl)-2-hydrazino-3H-indol-3-ol; |
| 67 | 5-fluoro-2-hydrazino-3-phenyl-3H-indol-3-ol; |
| 68 | 2-hydrazino-3-(iodophenyl)-6-propyl-3H-indol-3-ol; |
| 69 | 3-(4-ethoxyphenyl)-2-hydrazino-3H-indol-3-ol; and |
| 70 | 2-hydrazino-3-(4-propylphenyl)-3H-indol-3-ol. |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A compound selected from those having the formula

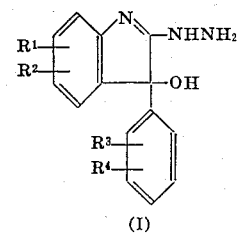

(I)

where $R^1$ and $R^3$ are the same or different members selected from the group consisting of hydrogen, halogen, lower alkyl and lower alkoxy; and $R^2$ and $R^4$ are the same or different members selected from the group consisting of hydrogen and sulfamoyl.

2. A compound as described in claim 1 which is: 4-chloro-3-(5-chloro-2-hydrazino-3-hydroxy-3H-indol-3-yl)-benzenesulfonamide.

3. A compound as defined in claim 1 which is 5-chloro-2-hydrazino-3-phenyl-3H-indol-3-ol.

4. A compound as defined in claim 1 which is 6-chloro-3-(2-chloro-5-sulfamoylphenyl)-2-hydrazino-3-hydroxy-3H-indole-5-sulfonamide.

5. A process for the preparation of compounds having the formula:

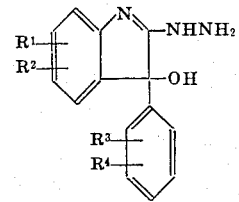

wherein $R^1$ and $R^3$ are selected from the group consisting of hydrogen, halogen, lower alkyl and lower alkoxy; and $R^2$ and $R^4$ are selected from the group consisting of hydrogen and sulfamoyl; which comprises contacting a compound selected from those having the formulas:

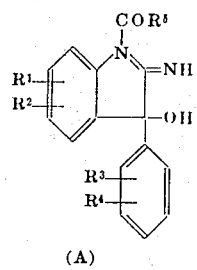 and 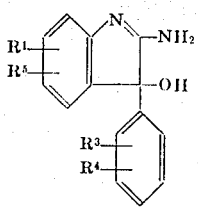

(A)          (B)

wherein $R^1$, $R^2$, $R^3$, $R^4$ are defined as above and $R^5$ is selected from the group consisting of lower alkyl, halo(lower)alkyl and dihalo (lower)alkyl; with hydrazine, in a reaction-inert solvent at a temperature range from about 60°C. to about 100°C. for a period of about one-half to about 4 hours.

6. A process as described in claim 5 wherein the reactant is a 3-aryl-1-[dihalo(lower)alkanoyl]-2-imino-3-indolinol.

UNITED STATES PATENT OFFICE
CERTIFICATE OF CORRECTION

Patent No. 3,714,188　　　　　Dated January 30, 1973

Inventor(s) Stanley C. Bell and Carl Gochman

It is certified that error appears in the above-identified patent and that said Letters Patent are hereby corrected as shown below:

At column 1, line 59 $R^5$ and $R^6$ should not be italicized

At column 2, line 18 should read as follows:

4-chloro-3-(5-chloro-2-hydrazino-3-hydroxy-3H-

At column 5, line 59 the "1" should be a hyphen

At column 8, line 30 in Example 7 should read as follows:

5-chloro-1-(2,2-dichloroacetyl)-2-imino-3-(m-

At column 8, line 34 the spelling of "sulfamolybenzoyl" should be sulfamoylbenzoyl At column 14, line 60 in Claim 5 formula A omit 1 double bond in ring

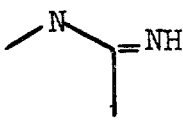

Signed and sealed this 3rd day of July 1973.

(SEAL)
Attest:

EDWARD M. FLETCHER, JR.　　　　　Rene Tegtmeyer
Attesting Officer　　　　　　　　Acting Commissioner of Patents